Patented Nov. 29, 1932

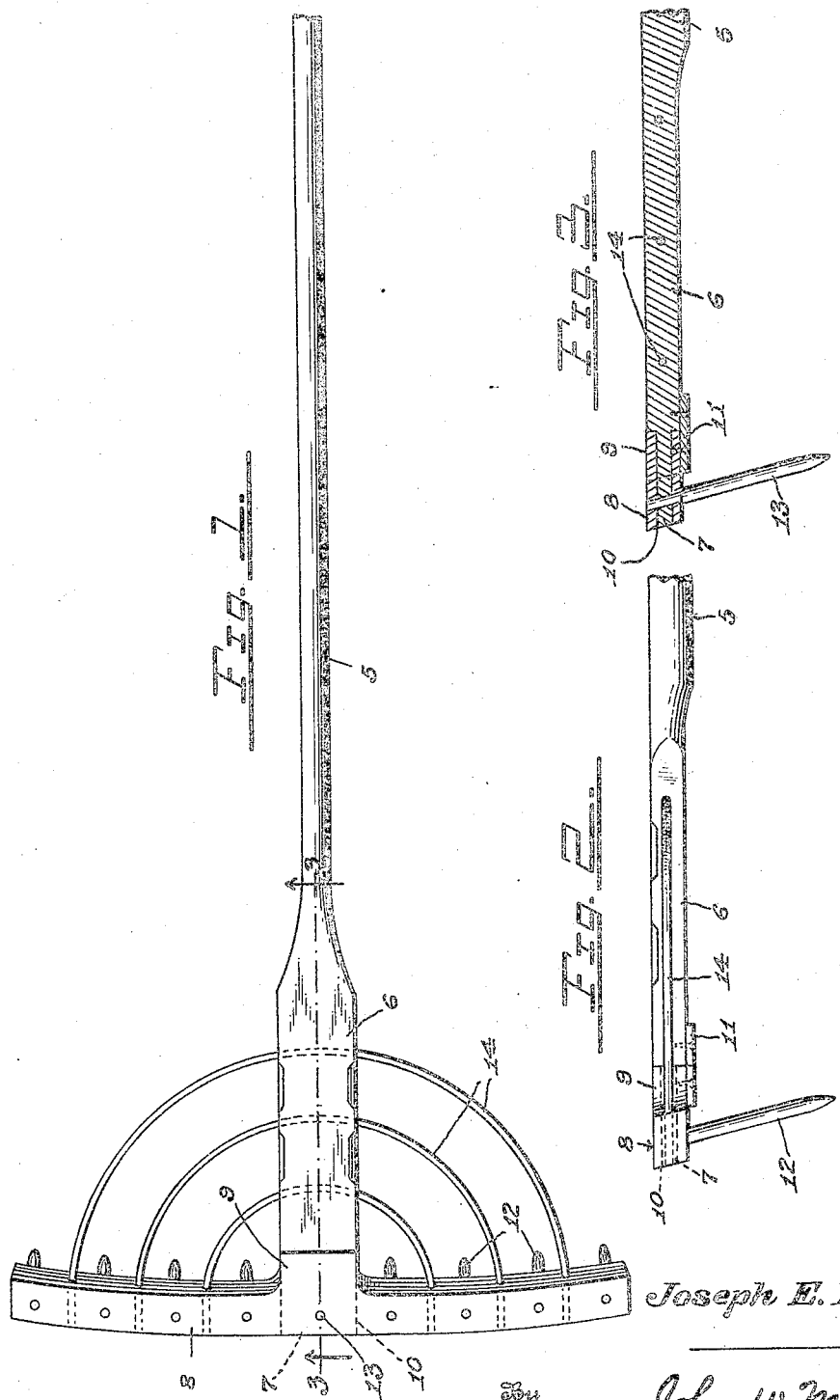

1,888,991

UNITED STATES PATENT OFFICE

JOSEPH E. LARSON, OF SEATTLE, WASHINGTON

RAKE

Application filed October 7, 1931. Serial No. 567,493.

My invention relates to rakes and certain objects of the invention are to provide a rake having in combination a relatively wide handle portion adjoining a relatively wide cross-head together with a plurality of reeds or the like secured in parallel semi-circular arrangement to the handle portion and to the cross-head and to provide the cross-head with teeth slanting in a direction toward the handle whereby a very efficient rake is provided with a maximum capacity for catching and holding grass, leaves and other rubbish. Further objects are to provide a rake composed entirely of wood and which is, therefore, light in weight, and which has the semi-circular reeds extending through the flat handle portion and through the cross head, and the handle also extending through the cross-head with one of the rake teeth serving as a securing means therefor, thus making a very strong and light brake.

With the above and other objects in view which will appear as the description proceeds, the invention consists of the novel construction, combination and arrangement hereinafter described and claimed. These objects are accomplished by devices illustrated in the accompanying drawing; wherein:—

Figure 1 is a top plan view of a rake embodying the features of my invention;

Fig. 2 is a view in side elevation of the raking end portion of the rake; and

Fig. 3 is a view in central vertical section through the same taken on a broken line 3—3 of Fig. 1.

Referring to the drawing throughout which like reference numerals indicate like parts, the numeral 5 designates the rake handle which is made of wood and is provided with a thin wide flat portion 6 having a reduced tongue 7. The cross-head, designated as a whole by the numeral 8, is also made of wood and is slightly curved toward the handle, and is centrally provided with a socket extension 9.

Said socket projection is provided with a slot 10 extending therethrough and through the cross-head and which slot is adapted to snugly receive the tongue of the handle. This arrangement provides a wide and strong joint whereby any lateral or twisting displacement of the handle is eliminated. If desired, a small plate 11 may be secured to the underside connection of the handle and cross-head for the purpose of increasing the strength at this point.

The cross-head 8 is beveled or slanted toward the handle 5 on its outer and inner faces and a plurality of equally spaced apart teeth 12 extend entirely through said cross-head and are disposed in slanting relation toward the handle and in parallel relation with the slanting faces of the cross-head. The central tooth, as designated by the numeral 13, extends through the handle tongue 7 thus securing the handle within the slot 10 as will be understood. A plurality of semi-circular reeds 14, made of flexible wood that is small and round in cross section, are arranged in parallel spaced apart relation and extend entirely through the flat handle portion 6 and their ends extend through the cross-head 8 midway between the teeth 12. Said reeds, besides strengthening the rake, serve as a means for catching and holding grass, leaves and other rubbish when raking.

The main objects of the invention are to provide maximum increased strength of the rake without increasing its weight, and it will now be apparent that I have provided a rake that is very light in weight, which is very strong in construction at every point, and which is very efficient in its operation in use. Having thus described my invention, it being understood that minor changes may be resorted to in its construction, form and arrangement without departing from the scope and spirit of the invention, what I claim and desire to secure by Letters Patent of the United States is:—

1. A rake comprising in combination a handle having a wide flat end portion with a reduced tongue end, a slightly curved cross-head having a centrally projecting socket portion for its inwardly curved side, said socket portion having a slot extending therethrough and adapted to snugly receive the tongue end of the handle, the inner and outer faces of the cross-head slanting toward the handle, a plurality of aligned teeth extending in spaced apart relation through the cross-head and in slanting disposition parallel with the slanting faces of the cross-head, and the middle one of said teeth centrally disposed with respect to the cross-head and passing through the tongue end of the handle.

2. A rake comprising in combination a handle having a wide flat end portion with a reduced tongue end, a slightly curved cross-head having a centrally projecting socket portion for its inwardly curved side, said socket portion having a slot extending therethrough and through the cross-head and adapted to snugly receive the tongue end of the handle, the inner and outer faces of the cross-head slanting toward the handle, a plurality of teeth extending in spaced apart relation through the cross-head and in a slanting direction toward the handle and parallel with the slanting faces of the cross-head, the middle one of said teeth passing through the tongue end of the handle, and a plurality of thin reeds disposed in spaced apart semi-circular parallel relation extending through the flat handle portion and their ends extending through the cross-head midway between the teeth.

In testimony whereof I affix my signature.

JOSEPH E. LARSON.